Nov. 16, 1965   R. L. SHREVE   3,218,053
VEHICLE SUSPENSION INCLUDING ANTI-ROLL BAR ASSEMBLY
Filed Oct. 26, 1962   3 Sheets-Sheet 1
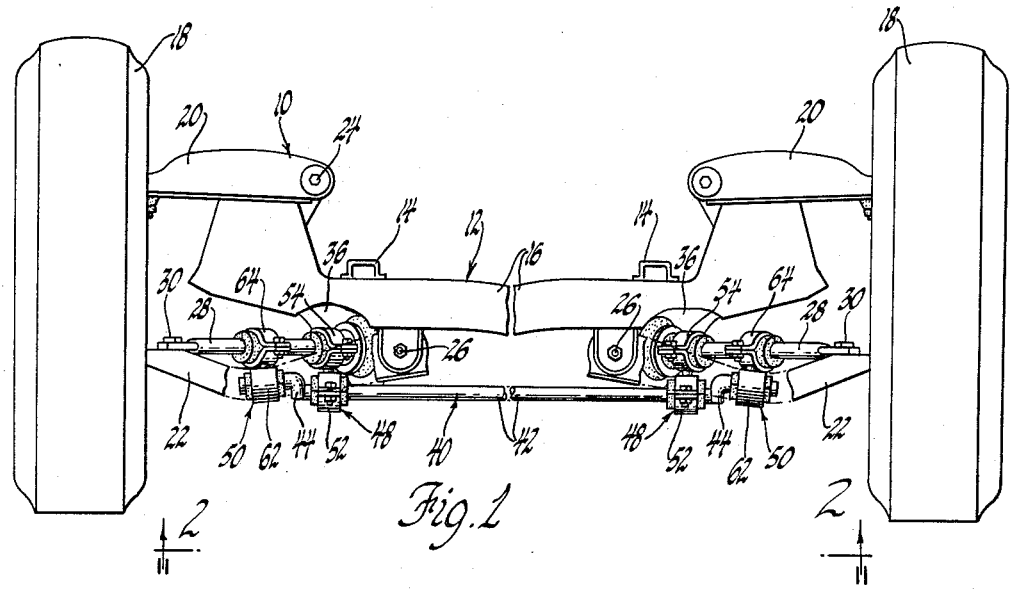
INVENTOR.
Russell L. Shreve
BY
Barnard & McGlynn
ATTORNEYS Nov. 16, 1965  R. L. SHREVE  3,218,053
VEHICLE SUSPENSION INCLUDING ANTI-ROLL BAR ASSEMBLY
Filed Oct. 26, 1962  3 Sheets-Sheet 2

INVENTOR.
Russell L. Shreve
BY Barnard & McGlynn
ATTORNEYS

Nov. 16, 1965  R. L. SHREVE  3,218,053
VEHICLE SUSPENSION INCLUDING ANTI-ROLL BAR ASSEMBLY
Filed Oct. 26, 1962  3 Sheets-Sheet 3

INVENTOR.
Russell L. Shreve
BY
Barnard & McGlynn
ATTORNEYS 3,218,053
VEHICLE SUSPENSION INCLUDING
ANTI-ROLL BAR ASSEMBLY
Russell L. Shreve, 28111 Dartmouth,
Madison Heights, Mich.
Filed Oct. 26, 1962, Ser. No. 233,370
18 Claims. (Cl. 267—11)

This invention relates to vehicle suspensions and, in particular, to a vehicle suspension including an anti-roll or anti-sway torsion bar assembly to add roll rate to the suspension without adding to or adversely affecting the ride rate thereof.

Vehicle suspensions of the type to which the present invention pertains, and referring to an independent front wheel suspension by way of example, typically comprise suspension control arms operatively pivotally connecting a vehicle sprung mass including a vehicle frame to a pair of ground-engaging wheel means respectively disposed on opposite sides of the frame for relative rising and falling movement therebetween. In this regard, such a suspension further includes a suitable spring and shock absorber to yieldably resist such relative movement and, among other things, to provide a predetermined ride rate to the suspension for a soft and comfortable ride.

Thus, vehicle suspensions of the type aforementioned are designed to provide a desired ride rate and, hence, a soft and comfortable ride as the sprung mass of the vehicle including its frame move substantially vertically relative to the ground-engaging wheels. However, and particularly in view of the tendency of automotive engineers in recent times to decrease the ride rate of such suspensions to provide softer and softer rides, a problem is presented by the tendency of the sprung mass including the vehicle frame to roll or sway about its longitudinal axis and relative to the ground-engaging wheels due to various types of well known forces and driving conditions imposed upon the suspension. In other words, while the primary purpose of a vehicle suspension of the type aforementioned is to permit substantially vertical motion of the vehicle frame relative to its wheels while the latter move in substantial unison up or down to result in a soft and comfortable ride, certain forces imposed on the vehicle or its suspension have a tendency of causing the vehicle frame to roll or sway as aforementioned and the respective wheels disposed on opposite sides of the frame to move in opposite directions relative to the frame. As is well known in the art, such roll or sway is highly undesirable for many reasons including the fact that it adversely affects the ride and passenger comfort, driver control and vehicle safety.

These various adverse affects as well as others are age-old and are well recognized in the art. Generally speaking, it is further recognized and well accepted that there is no known substitute for an anti-roll or anti-sway torsion bar or stabilizer to minimize, if not eliminate, these problems and conditions. Thus, it is well known that such an anti-roll bar can be operatively interconnected between a pair of ground-engaging wheels on either side of the vehicle frame in such a manner as to torsionally resist the tendency of the respective wheels to move in opposite directions as is the case with the vehicle tending to roll or sway as aforementioned. However, notwithstanding the fact that such anti-roll bars as heretofore proposed provide a solution to the roll problems aforementioned, they have not been uniformly accepted by automotive manufacturers, particularly for their less expensive lines of vehicles, primarily due to cost considerations, not so much for the bar itself as for the additional labor and materials required in installing such prior bars.

Thus, the typical procedure used by manufacturers who have adopted such bars in installing the latter on their vehicles is to utilize special brackets and other attaching means requiring welding or drilling of the vehicle frame, or both, or similar procedures to mount one part of each end of the bar to the vehicle frame and another part thereof operatively to the vehicle wheel or its suspension so as to sense vertical movement of the latter relative to the vehicle frame. While the piece and labor price for such additional materials and procedures are not too substantial relatively speaking for a given vehicle, they become impressive figures when spread over a total production run of the vehicle and is an attractive saving to the manufacturer even though his vehicle is subject to the suspension problems aforementioned.

In addition, prior anti-roll bars which have been used by automotive manufacturers have been mounted and connected transversely of the vehicle frame by means including bolts, brackets or the like rigidly connecting respective terminal end portions of the bar with their respective axes substantially parallel to and to one side of a respective suspension member such as a lower control arm connected to each wheel. As a consequence, the bar and particularly its terminal end portions deflect laterally in one direction or other with respect to the axis of the suspension member such as a lower control arm, which prevents optimum interaction between the suspension member and the roll bar; that is, substantially reduces effective transmission of torsional forces to the bar to be resisted in response to undesirable wheel movement. In order to prevent such lateral movement of the bar relative to the suspension member to which it is connected, it has been proposed to provide an attaching portion on each suspension member of substantially square section with special brackets connecting the terminal end portions of the bar to such square section attaching portions to utilize such cross sectional configuration to reduce the problem of lateral deflection aforementioned. This problem can be solved, of course, merely by utilizing a relatively great number of spaced fasteners to securely connect the terminal ends of the bar in parallel fashion to the respective suspension members but, in either case, the cost is substantial and relatively severe and repeated forces must be absorbed by the special bracket or fasteners aforementioned due to the tendency of the connected ends of the bar to move laterally relative to the suspension member to which it is connected.

In view of the foregoing considerations, it is, therefore, a principal object and feature of this invention to provide an improved vehicle suspension including an anti-roll or anti-sway torsion bar or stabilizer adapted to be readily and easily detachably operatively connected between a pair of opposed ground-engaging wheels of a vehicle without requiring welding or drilling of the vehicle frame or the like, the bar functioning to add roll rate to the suspension to resist vertical movement of the wheels in opposite directions relative to the vehicle frame without adding ride rate thereto, whereby the desired ride rate and range of vertical motion of the vehicle frame relative to the wheels are not substantially altered, but the angle of roll or sway of the frame about its longitudinal axis is substantially reduced.

It is yet another object and feature of this invention to provide a vehicle suspension comprising, in combination, a vehicle frame, a pair of ground-engaging wheel means respectively disposed on opposite sides of the frame, independent yieldable suspension means including a rigid strut operatively connecting each of the aforementioned wheel means to the frame for yieldable rising and falling movement therebetween, the aforementioned respective rigid struts extending obliquely to the longitudinal axis of the frame and preventing or limiting movement of the respective wheel means longitudinally of the frame, and an anti-roll or anti-sway torsion bar extending transversely of the frame and including opposite end portions each of which is adapted to be connected at a pair of spaced locations to spaced portions of the respective struts, whereby the bar may be simply, easily and readily installed at its opposite ends solely and entirely to the aforementioned struts thereby avoiding the necessity of welding, drilling or otherwise acting upon the vehicle frame while the opposite ends of the bar are responsive to movement of the respective wheel means in opposite directions to torsionally resist such movement in the portion of the bar intermediate its ends.

More specifically, it is a further object and feature of this invention to provide an anti-roll or anti-sway bar of the type aforementioned further characterized by the fact that the opposite ends of the bar each include a pair of spaced attaching portions cooperable with a pair of spaced attaching portions on each of the respective rigid struts aforementioned, at least one of each spaced pair of attaching portions at each end of the bar, and preferably both thereof, extending angularly below the corresponding attaching portion or portions of the respective rigid strut, bracket means including resilient bushing members being employed to readily clampingly interconnect the respective attaching portions of the bar to the corresponding attaching portions of the respective struts whereby, particularly due to the angular relationship of the respective attaching portions, there is no serious problem of lateral deflection between the ends of the bar and the respective struts thereby adding to the simplicity of the attaching mechanism employed since the forces imposed thereon are substantially compressive or tensile in nature.

These and other objects, features and advantages of the invention will appear more fully hereinafter as the description thereof proceeds, reference being made to the drawings in which:

FIGURE 1 is a fragmentary front elevational view of a vehicle suspension illustrating one preferred embodiment of the invention;

FIGURE 2 is a fragmentary bottom plan view taken on line 2—2 of FIGURE 1;

Figure 3:
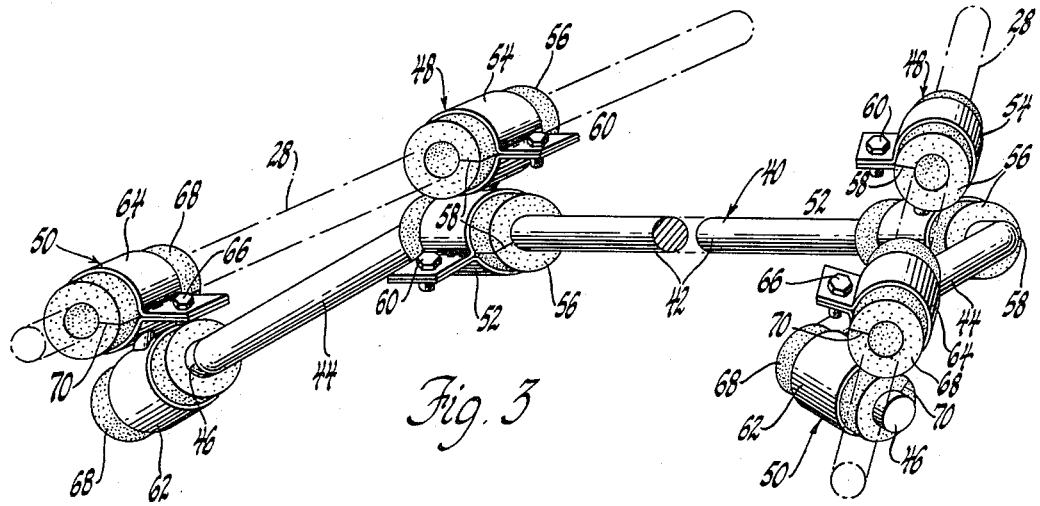
FIGURE 3 is an enlarged fragmentary perspective view of a preferred embodiment of an anti-roll or anti-sway torsion bar assembly utilized in the suspension of FIGURES 1 and 2, and illustrates its structural relationship with a suspension member indicated in dotted lines.

Referring now to FIGURES 1 through 3 and one preferred embodiment of the invention, the numeral 10 generally indicates an automotive vehicle comprising a conventional rigid longitudinally extending frame member 12 including the usual longitudinally extending laterally spaced frame rails 14 and cross frame member 16 rigidly secured thereto and extending somewhat laterally therebeyond. A pair of front ground-engaging wheels 18 are suitably independently suspended for rising and falling movement relative to each other and the vehicle frame as by means of the upper and lower rigid suspension control arms 20 and 22, respectively, having their laterally outer ends suitably connected in a conventional manner to the respective wheels and their inner ends pivotally connected at 24 and 26, respectively, to the vehicle frame. Naturally, the usual shock absorber and spring means, such as coiled springs, are associated with each wheel suspension in a conventional manner, but these details are not illustrated since they are well known and conventional and in order not to obscure the invention.

A rigid solid cylindrical strut 28 is rigidly connected as indicated at 30 to each of the lower control arms 22 adjacent the outer ends thereof, and extends rearwardly therefrom obliquely to the longitudinal axis of the frame and has its other end suitably mounted in a resilient or yieldable donut or bushing 32 confined within an aperture in a plate 34 forming a part of the rigid bracing 36 suitably secured rigidly to the cross frame 16 of the vehicle frame. A threaded nut and washer assembly 38 secures the laterally inner ends of the struts to the bushings 32 as will become more fully apparent hereinafter from a consideration of FIGURE 5 in connection with the second embodiment to be described. Suffice it to say at this point that the nature of this connection is such as to permit conical deflections of the struts 28 within the resilient bushing 32 as the wheels 18 rise and fall relative to each other and the vehicle frame, while the struts positively prevent or limit movement of the wheels longitudinally of the vehicle frame.

An anti-roll or anti-sway torsion bar of solid integral construction and substantially circular in cross section is indicated generally at 40, and comprises a main body 42 extending transversely of the vehicle frame rearwardly of the cross frame 16 and the wheels 18, and crank arms 44 at each end thereof extending generally longitudinally of the vehicle frame and each terminating in laterally extending terminal end portions 46. While the general configuration of the bar 40 will depend in the first instance on the structure and relative location of the various frame members and components of the suspension assembly and, hence, the clearance available for mounting the bar, it is significant to note that, once the clearance considerations have been met, each end of the bar includes a pair of spaced attaching portions the axes of which are angularly related with respect to the axes of corresponding spaced pairs of attaching portions on each of the struts 28 for connecting such portions of the bar to such portions of the struts in a manner to appear more fully hereinafter.

Thus, the respective ends of the main body 42 of the bar extend beneath and at an angle to the axis of the respective struts 28, and such ends are adapted to be connected to corresponding attaching portions of the respective struts adjacent bushing 32 by means of clamp bracket and bushing assemblies 48. In similar fashion, the respective crank arms 44 of the bar extend beneath and across the axis of the respective struts and the terminal end portions 46 then extend beneath and at an angle to the axis of corresponding attaching portions of the respective struts and are connected thereto by the clamp bracket and bushing assemblies 50.

Referring particularly to FIGURE 3, each of the clamp bracket and bushing assemblies 48 comprises clamp bracket members 52 and 54 rigidly secured together in angular relationship so as to be respectively substantially aligned with the respective ends of the main body 42 of the bar and the corresponding attaching portion of the respective struts 28 adjacent their connections in bushings 32. In addition, each such assembly includes a resilient bushing 56 slit longitudinally of its length as indicated at 58 to facilitate assembly upon and receipt of the respective attaching portions of the bar and the struts 28 as will be immediately clear from the drawings. Each of the clamp bracket members 52 and 54 includes ears and fasteners 60 so as to clampingly engage the respective bushings about the bar portions and strut portions aforementioned.

In similar fashion, each of the clamp bracket and bushing assemblies 50 comprises clamp bracket members 62 and 64 rigidly secured together in angular relationship so as to be respectively substantially axially aligned with respective terminal end portions 46 of the bar and the corresponding attaching portion of the respective struts 28. Each of the clamp bracket members 62 and 64 also includes ears and fastener means 66 so as to clampingly engage a resilient bushing 68 slit longitudinally as indicated at 70 to facilitate mounting about the respective terminal end portions of the bar and the corresponding attaching portion of the respective struts 28.

In installing the bar on a vehicle, the respective bracket and bushing assemblies 48 and 50 are preferably preassembled on the anti-roll or anti-sway bar to form a sub-assembly, after which the respective bushing members 56 and 68 are mounted on the spaced attaching portions of the respective struts 28 and the clamp brackets 54 and 64 tightened thereon to firmly mount the entire bar at its opposite ends at two spaced locations solely and entirely to the respective struts.

As the vehicle travels down a road, the suspension mechanism provides the predesigned ride rate and soft ride as the vehicle frame 12 and the wheels 18 move substantially vertically relative to each other and the wheels in substantial unison with each other in the same direction. At this time, since the wheels are moving in unison, and irrespective of the direction of such movement relative to the frame, it will be readily apparent that the bar 40 does not add anything to the ride rate of the vehicle as determined by the suspension mechanism. However, in the event that the vehicle frame tends to sway about its longitudinal axis and, hence, the respective wheels 18 move in opposite directions to each other and relative to the frame 12, such motion is transmitted from the respective struts 28 to the main body 42 of the bar which then torsionally resists such movement to limit the angle of roll or sway. At all times, and due to the angular relationship of the respective attaching portions of the bar to the struts 28 at the bracket and bushing assemblies 48 and 50, these connections act substantially in compression or tension toward or away from each other which minimizes wear on the bushings and avoids the problem of any of these connections attempting to move laterally with respect to its corresponding attachment. In the final analysis, therefore, the bar may be simply and quickly attached to the vehicle and in a manner to minimize stresses imposed on the attaching bracket and bushing assemblies, thereby contributing to a relatively simple, efficient and inexpensive suspension assembly.

Figure 4:
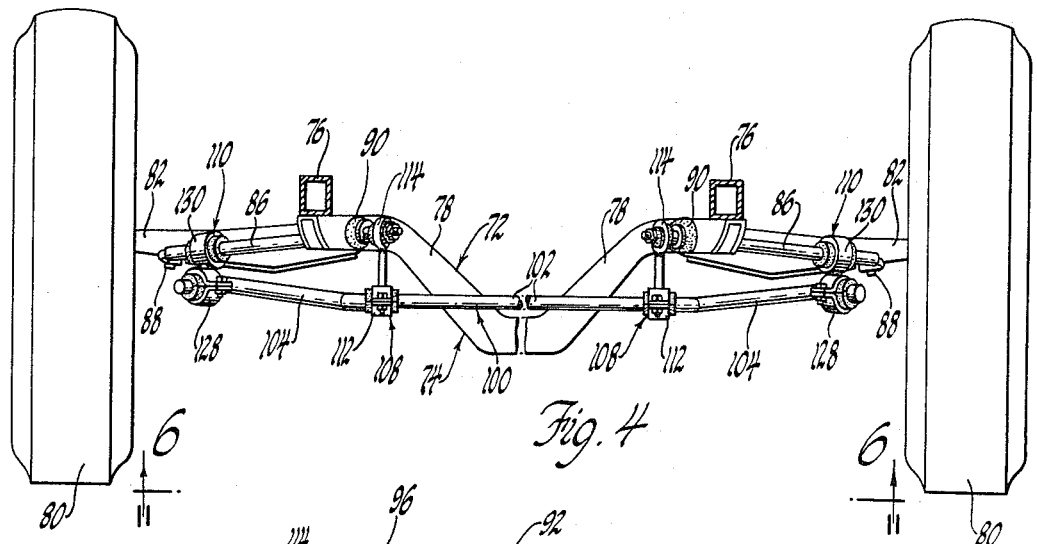
FIGURE 4 is a fragmentary front elevational view of a vehicle suspension illustrating another embodiment of the invention.
Figure 5:
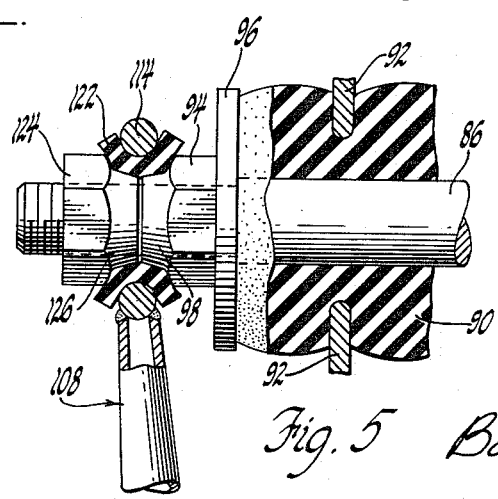
FIGURE 5 is an enlarged fragmentary longitudinal sectional view of a portion of the suspension of FIGURE 4, and illustrates the connection of a rigid strut member of the suspension to the vehicle frame and one connection of the anti-roll bar to one end of such strut.
Figure 6:
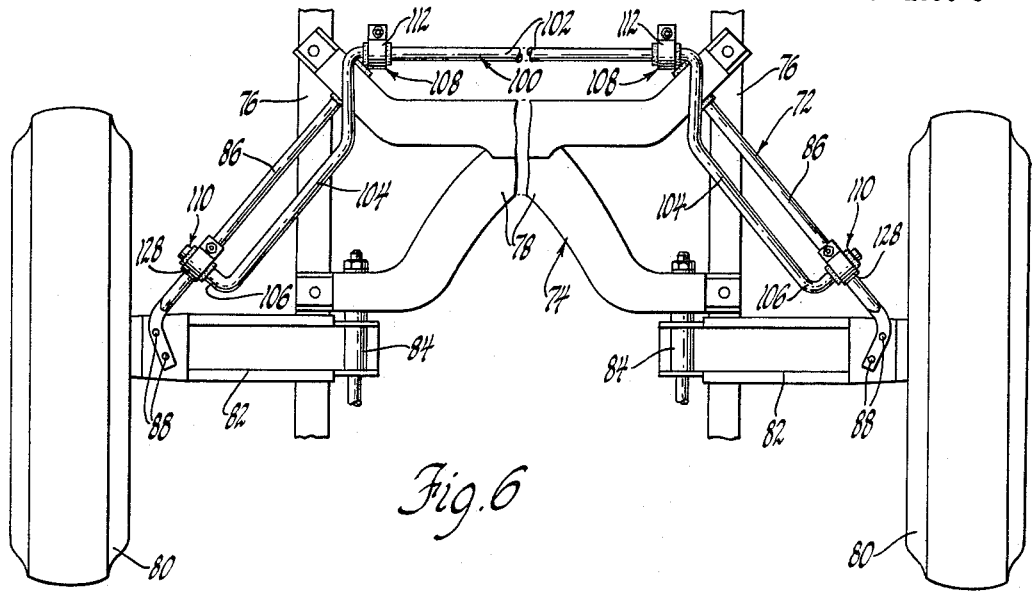
FIGURE 6 is a fragmentary bottom plan view taken on line 6—6 of FIGURE 4.

Referring now to FIGURES 4 through 6 and another preferred embodiment of the invention, the numeral 72 generally indicates an automotive vehicle comprising a conventional rigid longitudinally extending frame member 74 including the usual longitudinally extending laterally spaced frame rails 76 and a conventional cross K-frame member 78 rigidly secured therebetween. A pair of front ground-engaging wheels 80 are suitably independently suspended for rising and falling movement relative to each other and the vehicle frame as by means of upper and lower rigid suspension control arms as previously described, for the sake of simplicity only the lower control arms 82 being disclosed as having their laterally outer ends suitably connected in a conventional manner to the respective wheels and their inner end pivotally connected at 84 to the vehicle frame. Naturally, and as aforedescribed, the usual shock absorber and spring means, such as coiled springs, are associated with each wheel suspension in a conventional manner, but these details are also not illustrated since they are well known and conventional, and in order not to obscure the invention.

A rigid solid cylindrical strut 86 is rigidly connected as indicated at 88 to each of the lower control arms 82 adjacent the outer ends thereof, and extends forwardly therefrom obliquely to the longitudinal axis of the vehicle, and has its other end suitably mounted in a resilient or yieldable donut or bushing 90 confined within an aperture in a plate 92 forming a part of the cross K-frame 78 of the vehicle frame as illustrated particularly in FIGURE 5. A threaded nut 94 received upon the threaded laterally inner end of each of the struts 86 engages a washer 96 abutting the donut or bushing 90 to secure the laterally inner ends of the struts within the bushings or donuts so as to permit conical deflections of the struts 86 within the resilient bushing or donuts as the wheels 80 rise and fall relative to each other and the vehicle frame, while the struts positively prevent or limit movement of the wheels longitudinally of the vehicle frame. As will now be apparent, the nut 94, washer 96 and bushing or donut 90 may be substantially identical to the bushing 32 and nut and washer assembly 38 previously described in connection with the embodiment of FIGURES 1 through 3, although the nut 94 of the present embodiment also includes a conically tapering head portion 98 for a reason to appear more fully hereinafter.

An anti-roll or anti-sway torsion bar of solid integral construction and substantially circular in cross section is indicated generally at 100, and comprises a main body 102 extending transversely of the vehicle frame forwardly of the cross K-frame 78 and the wheels 80, and crank arms 104 at each end thereof extending generally longitudinally rearwardly of the vehicle frame and each terminating in generally laterally extending terminal end portions 106. Again, while the general configuration of the bar 100 will depend in the first instance on the structure and relative location of the various frame members and components of the suspension assembly and, hence, the clearance available for mounting the bar, it is significant to note that, once the clearance considerations have been met, each end of the bar includes a pair of spaced attaching portions the axes of which are angularly related with respect to the axes of corresponding spaced pairs of attaching portions on each of the struts 86 for connecting such portions of the bar to such portions of the struts in a manner to appear more fully hereinafter.

Thus, the respective ends of the main body 102 of the bar extend beneath and at an angle to the axis of the respective struts 86, and such ends are adapted to be connected to corresponding attaching portions at the extreme laterally inward ends of the respective struts on the sides of bushing or donuts 90 remote from the connections 88 of the struts to the lower control arms by means of clamp bracket and bushing assemblies 108. In similar fashion, the respective crank arms 104 of the bar extend beneath and across the axis of the respective struts and the terminal end portions 106 then extend beneath and at an angle to the axis of corresponding attaching portions of the respective struts, and are connected thereto by the clamp bracket and bushing assemblies 110.

Figure 7:
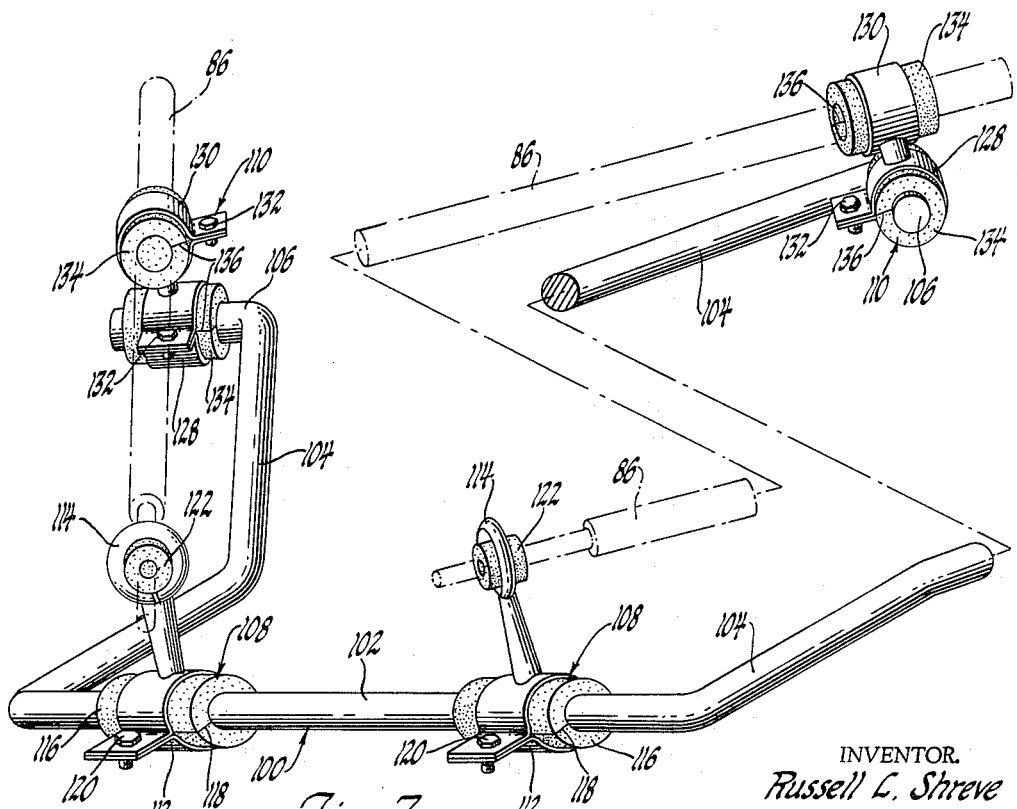
FIGURE 7 is an enlarged fragmentary perspective view of another preferred embodiment of an anti-roll or anti-sway torsion bar assembly utilized in the suspension of FIGURES 4 through 6, and illustrates its structural relationship to the aforementioned struts which are indicated in dotted lines.

Referring particularly to FIGURES 5 and 7, each of the clamp bracket and bushing assemblies 108 comprises a clamp bracket member 112 and hanger ring 114 rigidly secured together in angular relationship so as to be respectively substantially aligned with the respective ends of the main body 102 of the bar and the corresponding attaching portions at the extreme ends of the respective struts 86 adjacent their connections to the bushings or donuts 90. In addition, each such assembly includes a resilient bushing 116 slit longitudinally of its length as indicated at 118 to facilitate assembly upon and receipt of the attaching portions at the ends of the main body of the bar as will be immediately clear from the drawings, each of the clamp bracket members 112 further including ears and fasteners 120 so as to clampingly engage the respective bushings 116 about the bar portions aforementioned. On the other hand, each such assembly includes a resilient bushing 122 adapted to be installed upon the threaded end of each strut 86 in engagement with the conical head 98 of each nut 94 and within the hanger ring 114, another nut 124 including a head 126 tapering conically in opposition to the head of the nut 94 then being threadably engageable upon such extreme ends of the struts, whereby the bushings 122 are compressed between the conical heads of the nuts into substantially the configuration shown in FIGURE 5 to firmly confiningly mount the hanger ring on the extreme laterally inner ends of the struts.

Each of the clamp bracket and bushing assemblies 110 comprises clamp bracket members 128 and 130 rigidly secured together in angular relationship so as to be respectively substantially axially aligned with respect to the terminal end portions portions 106 of the bar and the corresponding attaching portions of the respective struts 86. Each of the clamp bracket members 128 and 130 also includes ears and fastener means 132 so as to clampingly engage a resilient bushing 134 slit longitudinally as indicated at 136 to facilitate mounting about the respective terminal end portions of the bar and the corresponding attaching portion of the respective struts.

In installing the bar on a vehicle, the respective bracket and bushing assemblies 108 and 110 are preferably preassembled on the anti-roll or anti-sway bar to form a subassembly, after which the respective bushing members 122 and 134 are mounted on the spaced attaching portions of the respective struts 86, and the clamp brackets 130 and nut 124 installed to firmly mount the entire bar at its opposite ends at two spaced locations solely and entirely to the respective struts.

As the vehicle travels down a road, the suspension mechanism provides the predesigned ride rate and soft ride as the vehicle frame 72 and the wheels 80 move substantially vertically relative to each other and the wheels in substantial unison with each other in the same direction. At this time, since the wheels are moving in unison, and irrespective of the direction of such movement relative to the frame, it will be readily apparent that the bar 100 does not add anything to the ride rate of the vehicle as determined by the suspension mechanism. However, in the event that the vehicle frame tends to sway about its longitudinal axis and, hence, the respective wheels 80 move in opposite direction to each other and relative to the frame 74, such motion is transmitted from the respective struts 86 to the main body 102 of the bar which then torsionally resists such movement to limit the angle of roll or sway. At all times, and due to the angular relationship of the respective attaching portions of the bar to the struts at the bracket and bushing assemblies 108 and 110, these connections act substantially in compression or tension toward or away from each other which minimizes wear in the bushings and completely avoids the problem of any of these connections attempting to move laterally with respect to its corresponding attachment. In the final analysis, therefore, the bar may be simply and quickly attached to the vehicle and in a manner to minimize stresses imposed on the attaching bracket and bushing assemblies, thereby contributing to a relatively simple, efficient and inexpensive suspension assembly.

While but two forms of the invention has been shown and described, other forms will not be apparent to those skilled in the art. Therefore, it will be understood that the embodiments shown in the drawings and described above are merely for illustrative purposes, and are not intended to limit the scope of the invention which is defined by the claims which follow.

I claim:

1. In a vehicle suspension, the combination comprising a vehicle frame, a pair of ground-engaging wheel means respectively disposed on opposite sides of said frame, independent suspension means each including upper and lower suspension control arms and a rigid strut operatively connecting each of said wheel means to said frame for relative rising and falling movement therebetween, said rigid strut extending obliquely to the longitudinal axis of said frame and limiting movement of said respective wheel means longitudinally of said frame, an anti-roll torsion bar extending transversely of said frame and including a pair of spaced attaching portions adjacent each end thereof, each of said struts including a pair of spaced attaching portions cooperable with said pair of attaching portions adjacent each end of said bar, said bar extending across the axis of the respective strut between said attaching portions adjacent each end, both of said pair of attaching portions at each end of said bar extending angularly to the axes of the corresponding attaching portions of its associated strut, and a pair of bracket means connecting said pair of attaching portions adjacent each end of said bar to said pair of attaching portions of said respective struts said bracket means being the sole means mounting said bar relative to said frame.

2. In a vehicle suspension, the combination comprising a vehicle frame, a pair of ground-engaging wheel means respectively disposed on opposite sides of said frame, independent suspension means each including upper and lower suspension control arms and a rigid strut operatively connecting each of said wheel means to said frame for relative rising and falling movement therebetween, said rigid strut extending obliquely to the longitudinal axis of said frame and limiting movement of said respective wheel means longitudinally of said frame, and anti-roll torsion bar extending transversely of said frame and including a pair of spaced attaching portions adjacent each end thereof, each of said struts including a pair of spaced attaching portions cooperable with said pair of attaching portions adjacent each end of said bar, said bar extending across the axis of the respective strut between said attaching portions adjacent each end, a pair of bracket means connecting said pair of attaching portions adjacent each end of said bar to said pair of attaching portions of said respective struts, said bracket means being the sole means mounting said bar relative to said frame, and said respective pairs of bracket means are connected to said respective struts at opposite sides of the connection of the latter to said frame.

3. In a vehicle suspension, the combination comprising a vehicle frame, a pair of ground-engaging wheel means respectively disposed on opposite sides of said frame, independent suspension means each including upper and lower suspension control arms and a rigid strut operatively connecting each of said wheel means to said frame for relative rising and falling movement therebetween, said rigid strut extending obliquely to the longitudinal axis of said frame and limiting movement of said respective wheel means longitudinally of said frame, an anti-roll torsion bar extending transversely of said frame and including a pair of spaced attaching portions adjacent each end thereof, each of said struts including a pair of spaced attaching portions cooperable with said pair of attaching portions adjacent each end of said bar, said bar extending across the axis of the respective strut between said attaching portions adjacent each end, and a pair of bracket means connecting said pair of attaching portions adjacent each end of said bar to said pair of attaching portions of said respective struts, said bracket means being the sole means mounting said bar relative to said frame, said struts extend beyond the connection of the latter to said frame, and one of said pair of bracket means being connected to its associated strut intermediate the connection of the later to said respective wheel means and said frame, and the other of said pair of bracket means being connected to one end of its associated strut beyond its connection to said frame.

4. The vehicle suspension as defined in claim 3 wherein said other bracket means comprises a clamp bracket and hanger ring rigidly secured together, first resilient bushing means clampingly engaged by said clamp bracket and receiving its associated attaching portion of said bar, second resilient bushing means disposed within said hanger ring and receiving said one end of said strut, and opposed threaded nut members including opposed conical portions thereof on said one end of said strut for deforming said second bushing about said hanger ring.

5. The vehicle suspension as defined in claim 4 wherein said first bushing means is slit longitudinally to facilitate assembly on said strut.

6. In a vehicle suspension, the combination comprising a vehicle frame, a pair of ground-engaging wheel means respectively disposed on opposite sides of said frame, independent suspension means operatively connecting each of said wheel means to said frame for relative rising and falling movement therebetween and including a rigid strut extending obliquely to the longitudinal axis of said frame and limiting movement of said respective wheel means longitudinally of said frame, an anti-roll torsion bar comprising a torsionally resistant main body extending transversely of said frame and including crank arms extending generally longitudinally of said frame from each end of said main body, and a pair of bracket means respectively connecting each end of said main body of said bar and said crank arm extending therefrom to a respective strut at a pair of spaced locations thereon.

7. The vehicle suspension as defined in claim 6 wherein each end of said main body of said bar extends angularly to the axis of its associated strut means.

8. The vehicle suspension as defined in claim 6 wherein said respective rigid struts extend longitudinally rearwardly from said respective wheel means to said frame, said main body of said bar extending transversely of said frame rearwardly of said wheel means, and said crank arms thereof extending longitudinally forwardly therefrom.

9. The vehicle suspension as defined in claim 6 wherein said respective rigid struts extend longitudinally forwardly from said respective wheel means to said frame, said main body of said bar extending transversely of said frame forwardly of said wheel means, and said crank arms thereof extending longitudinally rearwardly therefrom.

10. In a vehicle suspension, the combination comprising a vehicle frame, a pair of ground-engaging wheel means respectively disposed on opposite sides of said frame, suspension means operatively connecting each of said wheel means to said frame for relative rising and falling movement therebetween and including a rigid strut extending obliquely to the longitudinal axis of said frame and limiting movement of said respective wheel means longitudinally of said frame, an anti-roll torsion bar extending transversely of said frame and including attaching portions extending angularly to and crossing over the axis of corresponding attaching portions of said respective struts, and means connecting said respective attaching portions of said bar to said corresponding attaching portions of said respective struts, said last-named means being the sole means mounting said bar relative to said frame.

11. In a vehicle suspension, the combination comprising a vehicle frame, a pair of ground-engaging wheel means respectively disposed on opposite sides of said frame, independent suspension means each including upper and lower suspension control arms and a rigid strut operatively connecting each of said wheel means to said frame for relative rising and falling movement therebetween, said rigid strut extending obliquely to the longitudinal axis of said frame and limiting movement of said respective wheel means longitudinally of said frame, an anti-roll torsion bar extending transversely of said frame and including attaching portions extending angularly to the axis of corresponding attaching portions of said respective struts, and bracket means connecting said respective attaching portions of said bar to said corresponding attaching portions of said respective struts, said bracket means being the sole means mounting said bar relative to said frame.

12. In a vehicle suspension, the combination comprising a vehicle frame, a pair of ground-engaging wheel means respectively disposed on opposite sides of said frame, independent suspension means operatively connecting each of said wheel means to said frame for relative rising and falling movement therebetween and including a rigid strut extending obliquely to the longitudinal axis of said frame and limiting movement of said respective wheel means longitudinally of said frame, an anti-roll torsion bar comprising a torsionally resistant main body extending transversely of said frame and including crank arms extending generally longitudinally of said frame from each end of said main body, each of said crank arms including a terminal end portion extending at an angle to the axis of said respective strut, and a pair of bracket means connecting said bar to each of said struts at a pair of spaced locations thereon, one of said last-named bracket means connecting each terminal end portion of said bar to a respective strut, the other of said last-named bracket means connecting the main body of said bar to a respective strut.

13. In a vehicle suspension, the combination comprising a vehicle frame, a pair of ground-engaging wheel means respectively disposed on opposite sides of said frame, independent suspension means operatively connecting each of said wheel means to said frame for relative rising and falling movement therebetween and including a rigid strut extending obliquely to the longitudinal axis of said frame and limiting movement of said respective wheel means longitudinally of said frame, an anti-roll torsion bar comprising a torsionally resistant main body extending transversely of said frame and including end portions extending at an angle to the axis of a respective strut, crank arms extending generally longitudinally of said frame from each end portion of said main body and each including a terminal end portion extending at an angle to the axis of a respective strut, and a pair of bracket means respectively connecting each end portion of said main body of said bar and the terminal end portion of the crank arm extending therefrom to a respective strut at a pair of spaced locations thereon.

14. An anti-roll torsion bar assembly adapted to be connected to independent vehicle suspension means including a rigid strut extending obliquely between and relative to the longitudinal axis of the vehicle frame and ground-engaging wheel means respectively disposed on opposite sides thereof; said assembly comprising a bar including a torsionally resistant main body adapted to extend transversely of the vehicle frame and including end portions extending at an angle to the axis of a respective strut, crank arms extending angularly from each end portion of said main body and each including a terminal end portion extending at an angle to the axis of a respective strut, and a pair of bracket means for respectively connecting each end portion of said main body of said bar and the terminal end portion of the crank arm extending therefrom to a respective strut at a pair of spaced locations thereon.

15. The anti-roll bar assembly as defined in claim 14 wherein each of said bracket means comprises first and second bracket members rigidly secured together, and resilient bushing means engageable within each of said bracket members and receiving respective attaching portions of said bar and strut.

16. An anti-roll torsion bar assembly adapted to be connected to independent vehicle suspension means including a rigid strut operatively connecting a vehicle frame to ground-engaging wheel means respectively disposed on opposite sides thereof; said assembly comprising an anti-roll torsion bar adapted to extend transversely of the vehicle frame and including a pair of spaced attaching portions adjacent each end thereof for cooperation with a pair of spaced attaching portions on said respective struts, the portions of said torsion bar between said attaching portions extending across the axis of the associated strut, both of said pair of attaching portions adjacent each end of said bar extending angularly to and crossing over the axes of the corresponding attaching portions of its associated strut, and a pair of bracket means for connecting said pair of attaching portions at each end of said bar to said pair of attaching portions of said respective struts, said bracket means being the sole means for mounting said bar relative to said frame.

17. An anti-roll torsion bar assembly adapted to be connected to independent vehicle suspension means including a rigid strut operatively connecting a vehicle frame to ground-engaging wheel means respectively disposed on opposite sides thereof; said assembly comprising an anti-roll torsion bar adapted to extend transversely of the vehicle frame and including a pair of spaced attaching portions adjacent each end thereof for cooperation with a pair of spaced attaching portions on said respective struts, the portions of said torsion bar between said attaching portions extending across the axis of the associated strut, a pair of bracket means for connecting said pair of attaching portions at each end of said bar to said pair of attaching portions of said respective struts, said bracket means being the sole means for mounting said bar relative to said frame, each of said bracket means including first and second bracket members rigidly secured together, and resilient bushing means engaged within each of said bracket members and receiving respective attaching portions of said bar and strut.

18. The anti-roll torsion bar assembly as defined in claim 17 wherein each of said bushing means receiving attaching portions on said bar is slit longitudinally to facilitate assembly on said bar.

References Cited by the Examiner
UNITED STATES PATENTS

| | | | |
|---|---|---|---|
| 2,626,797 | 1/1953 | Cuskie | 267—11 |
| 2,674,450 | 4/1954 | Frank | 267—57 X |
| 2,972,489 | 2/1961 | Collier | 267—57 X |

FOREIGN PATENTS

| | | |
|---|---|---|
| 659,599 | 10/1951 | Great Britain. |
| 41,119 | 7/1956 | Germany. |

A. HARRY LEVY, *Primary Examiner.*

LEO FRIAGLIA, *Examiner.*